United States Patent [19]

Snyder et al.

[11] 4,326,980

[45] Apr. 27, 1982

[54] ACRYLIC COPOLYMER COMPOSITION INHIBITS SCALE FORMATION AND DISPERSES OIL IN AQUEOUS SYSTEMS

[75] Inventors: William R. Snyder, Warminster; Diane Feuerstein, Bensalem, both of Pa.

[73] Assignee: Betz Laboratories, Inc., Trevose, Pa.

[21] Appl. No.: 237,178

[22] Filed: Feb. 23, 1981

[51] Int. Cl.$^3$ .............................................. C02F 5/10
[52] U.S. Cl. .................................. 252/180; 210/701; 252/312
[58] Field of Search .................. 210/701; 252/82, 312, 252/180

[56] References Cited

U.S. PATENT DOCUMENTS 4,029,577  6/1977  Godlewski ........................ 210/701

Primary Examiner—John D. Welsh

Attorney, Agent, or Firm—Alexander D. Ricci; Bruce E. Peacock

[57] ABSTRACT

Method and composition for controlling the deposition of scale imparting precipitates on structural parts of a system exposed to an aqueous medium containing scale imparting precipitates, under scale imparting conditions are disclosed. Specifically, these precipitates are either calcium carbonate, calcium sulfate, calcium phosphate or mixtures thereof. The method and composition are also efficacious in dispersing inorganic and organic matter, which may exist within a cooling system, boiler system, or the like. The composition comprises an acrylic acid/lower alkyl hydroxylated acrylate copolymer (I) which is administered to the system in combination with an alkyl phenoxy polyethoxyethanol compound (II). The method comprises administering an effective amount of the combined treatment (I and II) to the aqueous system to be treated.

29 Claims, No Drawings

ACRYLIC COPOLYMER COMPOSITION INHIBITS SCALE FORMATION AND DISPERSES OIL IN AQUEOUS SYSTEMS

FIELD OF THE INVENTION

The present invention relates to a method and composition for controlling the formation and deposition of scale forming salts, particularly calcium carbonate, calcium phosphate and calcium sulfate, in aqueous mediums. The compositions and methods of the present invention also act as dispersants for suspended inorganic particulate matter, such as clay and iron oxides, and surprisingly serve to effectively disperse organic matter, such as oil.

BACKGROUND OF THE INVENTION

Although the invention has the general applicability to any given system where the formation and deposition of calcium carbonate, calcium phosphate and/or calcium sulfate is a potential problem, or where other problems due to deposition of suspended inorganic matter, such as iron oxide and clay, or organic matter, such as oil, are encountered, the invention will be discussed in detail as it concerns cooling water and boiling water systems.

The term "cooling water" is applied whenever water is circulated through equipment to absorb and carry away heat. This definition includes air conditioning systems, engine jacket systems, refrigeration systems as well as the multitude of industrial heat exchange operations, such as found in oil refineries, chemical plants, steel mills, etc.

The once-through cooling system, as the name implies, is one in which the water is passed through the heat exchange equipment and the cooling water is then discharged to waste. Usually, a once-through system is employed only where water at suitably low temperature is readily available in large volume and at low cost. The normal source of once-through cooling water is from wells, rivers and lakes where the cost involved is that of pumping only. In a once-through system, no evaporation takes place and consequently the water does not concentrate. Circulating water characteristics are the same as the makeup water.

The use of a recirculating system, in which a cooling tower, spray pond, evaporative condenser and the like serve to dissipate heat, permits great economy in makeup water requirements. With dwindling supplies of fresh cold water available for industries' cooling requirements, increased use must be made of recirculating systems in which the cooling water is used over and over again.

After passage of the circulating water through the heat exchange equipment, the water is cooled when passing over the cooling tower. This cooling effect is produced by evaporation of a portion of the circulating water in passing over the tower. By virtue of the evaporation which takes place in cooling, the dissolved solids and suspended solids in the water become concentrated.

The circulating water becomes more cncentrated than the makeup water due to this evaporation loss. Cycles of concentration is the term employed to indicate the degree of concentration of the circulating water as compared with the makeup. For example, two cycles of concentration indicates the circulating water is twice the concentration of the makeup water.

Deposits in lines, heat exchange equipment, etc., may originate from several causes. For example, the precipitation of calcium carbonate, calcium sulfate and calcium phosphate will form scale. In addition, solids foulant particles may enter the system. Through collisions with neighboring solids particles, these foulants may agglomerate to a point where they either foul a heat transfer surface or begin to accumulate in lower flow areas of the system. Also, organic compounds may enter the system as a result of process leakage or the air scrubbing effect of the cooling tower. These materials adsorb to surfaces within the system and serve as matrices for entrainment of solids particles.

On the other hand, corrosion is the electrochemical reaction of a metal with its environment. It is a destructive reaction and, simply stated, is the reversion of refined metals to their natural state. For example, iron ore is iron oxide. Iron ore is refined into steel. When steel corrodes, it also forms iron oxide.

In speaking of deposits which form in cooling water systems, it is important to bear in mind the mechanism causing the deposit, otherwise confusion may result. In general, the term "scale" applies to deposits which result from crystallization or precipitation of salts from solution. Wasting away of a metal is the result of corrosion. The agglomeration of suspended solids particles also results in deposit formation. While a deposit results in all of these cases, the mechanisms of formation are different and different corrective methods are required to prevent each type of deposit.

Some of the factors which affect scale formation are temperature, rate of heat transfer, the calcium, sulfate, magnesium, silica, phosphate, alkalinity, dissolved solids and pH of the water.

In the past in order to minimize the formation of the scale forming salts, cooling water systems were operated at pH's where the solubility of the "hardness" or "scale forming" ions was the greatest. Because the pH's of the systems were acidic, corrosion inhibitors together with dispersants were the normal treatment. Corrosion inhibition in most instances required chromate treatment. With the advent of tight control regarding toxic pollutant discharge, operating prameters of cooling water systems had to be changed in an attempt to utilize non-chromate treatment. The development of high pH and/or non-chromate corrosion programs over the past few years has concurrently enhanced the potential for heat exchange fouling due to chemical precipitation. Presently, most non-chromate treatments include phosphate and/or phosphonic acid compounds, such as the alkali metal polyphosphates, organophosphates, e.g., phosphate esters, etc., amino-trimethylenephosphonic acid, hydroxy ethylidene diphosphonic acid, and water soluble salts thereof. However, the reversion of the polyphosphates and the organic phosphates plus the use of alkaline operating conditions leads to the formation and deposition of the highly insoluble calcium phosphate. Also since there may be phosphate in the makeup water supply, for example, tertiary sewage treatment effluent for makeup water, calcium phosphate scaling has become one of the major problems encountered. Of course, the formation of calcium sulfate in cooling water systems also results in a scale formation problem. Calcium sulfate is often associated with the use of sulfuric acid for pH control, especially in connection with sidestream softening, and with the greater calcium concentrations associated with higher cycles of concentration.

Calcium carbonate scale is encountered in cooling water systems due to the decomposition of calcium bicarbonate. The solubility of this particular deposit decreases with a corresponding rise in temperature. Of course, calcium carbonate is soluble in acidic solutions, and as the pH of the cooling water is lowered, scale becomes less of a problem. However, as noted above, since the advent of higher pH maintenance, in cooling water systems to minimize corrosion, calcium carbonate scale formation remains a problem.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, Pa., Pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, those operations are only moderately effective. In all cases, external treatment does not in itself provide adequate treatment since muds, sludge, silts and hardness-imparting ions escape the treatment, and eventually are introduced into the steam generating system. The problems which result from their introduction into the steam generating system are apparent. Since the deposit forming materials are present, they have a tendency to accumulate upon concentration of the water and to settle at points in the system where there is low flow, thus restricting water circulation. The baking of mud and/or sludge on tubes and sheets will result in overheating and failure, thereby requiring downtime for repair or replacement of the structural parts. In addition, mud, sludge and silts may become incorporated in scale deposits adding to their volume and heat insulating effect.

Accordingly, internal treatments have been necessary to maintain the mud and silts in a suspended state. These internal treatments have been generally referred to in the industry as sludge conditioning agents.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their deposition. The carbonates of magnesium and calcium are not the only problem compounds as regards scale, but also waters having high contents of phosphate, sulfate and silicate ions either occurring naturally or added for other purposes cause problems since calcium and magnesium, and any iron or copper present, react with each and deposit as boiler scale. As is obvious, the deposition of scale on the structural parts of a steam generating system causes poorer circulation and lower heat transfer capacity, resulting accordingly in an overall loss in efficiency.

Although the foregoing is directed for the most part to cooling water systems and boiler water systems, or more specifically steam generating systems, the same problems occur in scrubber systems and the like. Any aqueous system having calcium and magnesium cations and the exemplified anions, particularly the phosphate and sulfate anions, will experience the formation and deposition of scaling salts.

In addition to the above noted scale and sludge formation problem in cooling and boiler systems, process leaks may often cause oil agglomeration or the like in the particular system. In addition, in certain scrubber systems, hydrocarbon vapors or mists may be drawn into the process gas stream and are scrubbed by the scrubbing liquor. Accordingly, it is highly desirable to disperse such oil agglomerations.

Because of the foregoing, the water treatment industry is constantly evaluating new processes, new products, new techniques in an effort to permit the various process water systems to operate more effectively for longer periods and at longer costs.

Many and different type materials have been used for the treatment of water systems. Of the vast number may be mentioned alginates, lignins, lignosulfonates, tannins, carboxymethyl cellulose materials, and synthetic polymers such as polyacrylates and polymethacrylates. For instance, in U.S. Pat. No. 4,029,577 (Godlewski et al), of common assignment herewith, certain acrylic acid/hydroxylated lower alkyl acrylate copolymers are disclosed as being effective in controlling the formation and deposition of scale and/or suspended solid matter which otherwise would occur in aqueous mediums containing scale imparting ions and dispersed particles.

In U.S. Pat. No. 3,663,448 (Ralston), the formation of solid scale-forming salts in aqueous solution is inhibited by adding to the solution small amounts of certain amino phosphonate compounds, together with a water soluble polymer having a molecular weight from about 500 to about 12,000 selected from the group consisting of polyacrylic acid, copolymers of acrylic acid and up to 50% acrylamide and polyacrylamide in which at least 50% of the amide groups are hydrolyzed.

U.S. Pat. No. 4,209,398 (Ii et al) discloses yet another water treating process wherein a polymer having a structural unit derived from a monomer having an ethylenically unsaturated bond and having one or more COOH radicals is combined with inorganic phosphates, phosphonic acids, organic phosphonic acid esters, or polyvalent metal salts, to prevent scale formation and corrosion.

GENERAL DESCRIPTION OF THE INVENTION

The present inventors have discovered that acrylic acid/lower alkyl hydroxy acrylate copolymers in combination with an alkyl phenoxy polyethoxyethanol compound, when added to an aqueous system, are particularly effective in inhibiting the formation of scale forming salts, particularly calcium carbonate, calcium phosphate and calcium sulfate salts. Surprisingly, the inventors have found that the combined treament is efficacious as a dispersant for solids particulate matter, such as iron oxide and clay, and organic matter, such as oil, existing in an aqueous medium.

The specific acrylic acid/lower alkyl hydroxy acrylate copolymers utilized in accordance with the present invention are disclosed in U.S. Pat. No. 4,029,577 (Godlewski et al). The entire disclosure of this patent is accordingly incorporated by reference.

As to the alkyl phenoxy polyethoxyethanol component which may be utilized in accordance with the invention, these are disclosed in U.S. Pat. No. 4,171,276 (Brehm), of common assignment herewith, for use in dust suppression methods and compositions.

The inventors have discovered that if the acrylic acid/lower alkyl hydroxy acrylate copolymers and the specific alkyl phenoxy polyethoxyethanol compounds are combined and added to the aqueous system, the formation and deposition of scale, particularly calcium carbonate, calcium phosphate and calcium sulfate scale can be controlled to a degree necessary to permit the continued and economical operation of the system. Moreover, use of the same combined treatment results in effective dispersal of solid particulate matter such as iron oxide and clay, which are both typically encountered in boiler and cooling water systems. In addition, the combined treatment of the present invention serves to effectively disperse organic substances, such as oil.

The polymers which are to be utilized in combination with the alkyl phenoxy polyethoxyethanol compound (APE) are those containing essentially moieties (a) derived from an acrylic acid compound, i.e.,

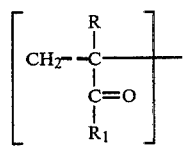

Formula 1 where R is hydrogen or a lower alkyl of from 1 to 3 carbon atoms and $R_1 = OH$, OM, $NH_2$, where M is a water soluble cation, e.g., $NH_4$, alkali metal (K, and Na), etc.; and (b) moieties of an hydroxylated lower alkyl (C=2-6) acrylate as represented for example by the formula

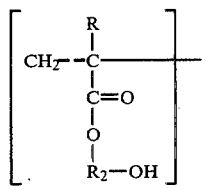

Formula 2 where R is H, or $CH_3$ and $R_2$ is a lower alkyl having from about 2 to 6 carbon atoms (the OH moiety may be attached to any of the C atoms in the alkyl group).

These polymers most advantageously have a mole ratio of moieties derived from an acrylic acid compound (Formula 1) to hydroxy alkyl acrylate derived moieties of from about 34:1 to about 1:4, and perferably 11:1 to 1:2, and possess a molecular weight of from 500 to 1,000,000 and preferably 1,000 to 500,000. The only criteria that is of importance that applies to the molar ratios of the described monomers in the copolymer, is that it is desirable to have a copolymer which is soluble in water. It should be noted that as the proportion of hydroxylated alkyl acrylate moieties increase, the solubility of the copolymer decreases.

The polymers utilized in accordance with the invention can be prepared by vinyl addition polymerization or by treatment of an acrylic acid or salt polymer. More specifically, acrylic acid or derivatives thereof or their water soluble salts, e.g., sodium, potassium, ammonium, etc. can be copolymerized with the hydroxy alkyl acrylate under standard copolymerization conditions utilizing free radicals such as benzoyl peroxide, azo bisisobutyronitrile or redox initiators such as ferrous sulfate and ammonium persulfate. The molecular weights of the resulting copolymer can be controlled utilizing standard chain control agents such as secondary alcohols (isopropanol), mercaptans, halocarbons, etc. Copolymers which may be utilized in accordance with the present invention are commercially available from National Starch Company. One such copolymer is sold under the trademark "Natrol 42". This particular copolymer is acrylic acid/2 hydroxy propyl acrylate wherein the molecular weight is about 6,000 and wherein the mole ratio of monomers (AA:HPA) is 3:1.

The hydroxy alkyl acrylate can be prepared by the addition reaction between the acrylic acid or its derivatives or water soluble salts and the oxide of the alkyl derivative desired. For example, the preferred monomer of the present invention is the propyl derivative. Accordingly, to obtain the hydroxylated monomer, acrylic acid is reacted with propylene oxide to provide the hydroxy propylacrylate monomer constituent of the copolymer utilized in accordance with the present invention.

The polymers of the present invention may also be prepared by reacting the polyacrylic acid or derivatives thereof with an appropriate amount of an alkylene oxide having from 2 to 6 carbon atoms such as ethylene oxide, propylene oxide and the like. The reaction takes place at the COOH or COM group of the moieties to provide the hydroxylated alkyl acrylate moiety.

The preferred copolymer prepared either by copolymerization or by reaction of polyacrylic acid or acrylate with the propylene oxide would be composed of units or moieties having the structural formulas

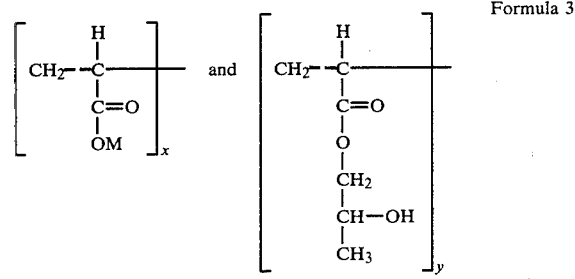

Formula 3 where M is as earlier defined and wherein the molar ratio of x to y is preferably 11:1 to 1:2. The copolymer preferably has a molecular weight of from 1,000 to 500,000.

The alkyl phenoxy polyethoxyethanol (APE) component of the combined treatment of the present invention, has the general formula

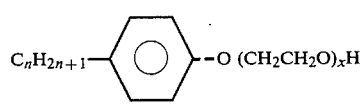

Formula 4 wherein n=7 to 10. In fact, it is thought that alkyl phenoxy polyethoxyethanols as above noted in Formula 4, wherein n=6 to 12 would be efficacious for the purpose. The upper limit for n (12) is considered to be based on the commercial feasibility and water solubility of the APE, while the lower limit is considered to be based on the required hydrophobicity of the APE (below n=6 the material would not be sufficiently hydrophobic). Described another way, the ethanol compound is alkyl-phenoxy polyethoxyethanol wherein the alkyl group contains 7 to 10 carbon atoms. As can be seen from the Formula 4, x represents the number of moles of ethylene oxide in the compound. A wide range of x values may be utilized successfully in accordance with the present invention. At a value of x=about 3, the APE is water soluble (values below about 3 are not thought to be water soluble). About 3 moles of ethylene oxide in the compound is the preferred lower limit. The upper limit for x is to be determined by the capability of making the compound. It is thought that 40 moles of ethylene oxide is the highest content that has been made and/or is commercially available. Accordingly, 40 moles of ethylene oxide in the APE could be considered the upper limit. The APE compound preferred for use in accordance with the invention is the octylphenoxy polyethoxyethanol compound having the formula

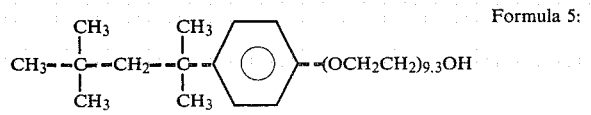

Formula 5:

This preferred APE compound is commercially available from Rohm and Haas Company and is sold under the trademark "Triton X-100".

The preferred molar ratio of the combined treatment of copolymer/APE, which may be utilized in accordance with the invention is from 1:3 to about 3:1.

The combined treatment should be added to the desired aqueous system in an amount effective for the purpose, taking into consideration the respect of concentrations in the water of the potential scale and deposit forming species, the pH of the water and the chemical and physical properties of the combined copolymer/APE composition. The criteria for proper treatment of any aqueous system would be apparent to the worker in the art of water treatment. For the most part, the combined treatment will be effective when utilized at levels of from about 0.1 to 500 parts per million of water, and preferably from about 2.5 to 100 parts per million parts of water contained within the aqueous system to be treated.

SPECIFIC EMBODIMENTS OF THE INVENTION

The invention will now be further described with reference to a number of specific examples which are to be regarded solely as illustrative, and not as restricting the scope of invention.

One method of evaluating deposit control activity of a material consists of measuring its ability to prevent bulk phase precipitation of the salt at conditions for which the salt would usually precipitate. It is additionally important to recognize that the material being evaluated is tested at "substoichiometric" concentrations. That is, typical molar ratios of precipitating cation to the material being evaluated are on the order of 20:1 and much greater. Consequently, stoichiometric sequestration is not the route through which bulk phase precipitation is prevented. The well known phenomenon is also called "threshold" treatment and is widely practiced in water treatment technology for the prevention of scale (salt) deposits from forming on various surfaces. In the results that follow calcium phosphate and calcium sulfate salts commonly found in industrial water systems under various conditions have been selected as precipitants. The combined treatment of the present invention has been evaluated for its ability to prevent precipitation (i.e., inhibit crystallization) of these salts.

The results are expressed as "percent inhibition", positive values indicate the stated percentage of the precipitate was prevented from being formed. Except as where noted to the contrary, the following conditions, solutions, and testing procedure were utilized to perform the calcium phosphate and calcium sulfate inhibition tests, the results of which are reported herein below in Tables I and II.

CALCIUM PHOSPHATE INHIBITION PROCEDURE

| Conditions | Solutions |
| --- | --- |
| T = 70° C. | 36.76 CaCl$_2$ . 2H$_2$O/liter DIH$_2$O |
| pH 8.5 | 0.4482g Na$_2$HPO$_4$/liter DIH$_2$O |
| 17 hour equilibration | |
| Ca$^{+2}$ = 250 ppm as CaCO$_3$ | |
| PO$_4^{-3}$ = 6 ppm | |

Procedure (1) To about 1800 ml DIH$_2$O in a 2 liter volumetric flask, add 20 ml of CaCl$_2$.2H$_2$O solution followed by 2 drops of conc. HCl.
(2) Add 40 ml of Na$_2$HPO$_4$ solution.
(3) Bring volume to 2 liters with DI water.
(4) Place 100 ml aliquots of solution in 4 oz glass bottles.
(5) Add treatment.
(6) Adjust pH as desired.
(7) Place in 70° C. water bath and equilibrate for 17 hours.
(8) Remove samples and filter while hot through 0.2μ filters.
(9) Cool to room temperature and take Absorbance measurements using Leitz photometer (640 nm).
Preparation for Leitz
a. 5 mls filtrate
b. 10 mls Molybdate Reagent
c. 1 dipper Stannous Reagent
d. Swirl 1 minute, pour into Leitz cuvette; wait 1 minute before reading.
(10) Using current calibration curve (Absorbance vs ppm PO$_4^{-3}$) find ppm PO$_4^{-3}$ of each sample.

Calculation
% Inhibition =

$$\frac{\text{ppm PO}_4^{-3} \text{ (treated)} - \text{ppm PO}_4^{-3} \text{ (control)}}{\text{ppm PO}_4^{-3} \text{ (stock)} - \text{ppm PO}_4^{-3} \text{ (control)}} \times 100$$

CALCIUM SULFATE INHIBITION PROCEDURE

| Conditions | Chemicals |
| --- | --- |
| pH = 7.0 | 1 × 10$^{-1}$ M CaCl$_2$ . 2H$_2$O |
| T = 50° C. | 1 × 10$^{-1}$ M Na$_2$SO$_4$ |
| 24 hr. equilibrium | |
| Ca$^{+2}$ = 2000 ppm | |
| SO$_4^{-2}$ = 4800 ppm | |

Procedure
(1) Add 50 ml of 10$^{-1}$ M CaCl$_2$.2H$_2$O pre-adjusted to pH 7.0 to a 4 oz. bottle.
(2) Add treatment.
(3) Add 50 ml of 10$^{-1}$ M Na$_2$SO$_4$ pre-adjusted to pH 7.0.

(4) Heat samples for 24 hours in a 50° C. water bath.
(5) Cool for 30 minutes, at least.
(6) Filter 5 ml through 0.45μ filters.
(7) Add NaOH to pH 12.0 and dilute to 50 ml with DI H₂O.
(8) Add Ca$^{+2}$ indicator (1 level).
(9) Titrate to purple-violet endpoint with EDTA.

Calculation $$\% \text{ Inhibition} = \frac{\text{mls titrant (treated)} - \text{mls titrant (control)}}{\text{mls titrant (Ca}^{+2}\text{ stock)} - \text{mls titrant (control)}} \times 100$$

TABLE I

Calcium Sulfate Inhibition

| | Copolymer | Molar Ratio of Monomers | Mol. Wt. Copolymer | APE Compound | Molar Ratio Copoly/APE | ppm Treatment | % Calcium Sulfate Inhibition |
|---|---|---|---|---|---|---|---|
| Comp. Ex. 1 | AA/HPA | AA/HPA = 3:1 | ≈6,000 | — | 1:0 | 0.5 | 15.9 |
| Comp. Ex. 2 | " | " | " | — | " | 1.0 | 44.0 |
| Comp. Ex. 3 | " | " | " | — | " | 2.0 | 100.00 |
| Comp. Ex. 4 | — | — | — | Formula 5 | 0:1 | 0.5 | 5.0 |
| Comp. Ex. 5 | — | — | — | " | " | 1.0 | 6.8 |
| Comp. Ex. 6 | — | — | — | " | " | 2.0 | 7.7 |
| Example 1 | " | " | ≈6,000 | " | 1:1 | 0.5 | 9.2 |
| Example 2 | " | " | " | " | " | 1.0 | 18.0 |
| Example 3 | " | " | " | " | " | 2.0 | 41.6 |
| Example 4 | " | " | " | " | 1:3 | 0.5 | 9.1 |
| Example 5 | " | " | " | " | " | 1.0 | — |
| Example 6 | " | " | " | " | " | 2.0 | 16.5 |
| Example 7 | " | " | " | " | 3:1 | 0.5 | 12.0 |
| Example 8 | " | " | " | " | " | 1.0 | 27.2 |
| Example 9 | " | " | " | " | " | 2.0 | 74.3 |
| Comp. Ex. 7 | AA/HPA | AA/HPA = 3:1 | ≈6,000 | — | 1:0 | 1.0 | 28.1 |
| Comp. Ex. 8 | " | " | " | — | " | 2.5 | 99.0 |
| Comp. Ex. 9 | " | " | " | — | " | 5.0 | 98.0 |
| Comp. Ex. 10 | — | — | — | "A" | 0:1 | 1.0 | 0.0 |
| Comp. Ex. 11 | — | — | — | " | " | 2.5 | 0.0 |
| Comp. Ex. 12 | — | — | — | " | " | 5.0 | 0.0 |
| Example 10 | AA/HPA | AA/HPA = 3:1 | ≈6,000 | " | 1:1 | 1.0 | 27.5 |
| Example 11 | " | " | " | " | " | 2.5 | 95.3 |
| Example 12 | " | " | " | " | " | 5.0 | 98.1 |
| Example 13 | AA/HPA | AA/HPA = 3:1 | ≈6,000 | "A" | 1:3 | 1.0 | 7.7 |
| Example 14 | " | " | " | " | " | 2.5 | 14.5 |
| Example 15 | " | " | " | " | " | 5.0 | 32.5 |
| Example 16 | " | " | " | " | 3:1 | 1.0 | 17.3 |
| Example 17 | " | " | " | " | " | 2.5 | 89.1 |
| Example 18 | " | " | " | " | " | 5.0 | 98.0 |
| Comp. Ex. 13 | — | — | — | "B" | 0:1 | 1.0 | 0.0 |
| Comp. Ex. 14 | — | — | — | " | " | 2.5 | 0.0 |
| Comp. Ex. 15 | — | — | — | " | " | 5.0 | 1.5 |
| Example 19 | AA/HPA | AA/HPA = 3:1 | ≈6,000 | " | 1:1 | 1.0 | 24.4 |
| Example 20 | " | " | " | " | " | 2.5 | 34.1 |
| Example 21 | " | " | " | " | " | 5.0 | 93.5 |
| Example 22 | " | " | " | " | 1:3 | 1.0 | 7.7 |
| Example 23 | " | " | " | " | " | 2.5 | 12.2 |
| Example 24 | " | " | " | " | " | 5.0 | 94.5 |
| Example 25 | " | " | " | " | 3:1 | 1.0 | 16.1 |
| Example 26 | " | " | " | " | " | 2.5 | 88.4 |
| Example 27 | " | " | " | " | " | 5.0 | 91.6 |

Formula 5 refers to the APE compound above noted in conjunction with said formula. AA/HPA is acrylic acid/hydroxy propyl acrylate copolymer "Natrol 42". "A" is octylphenoxy polyethoxyethanol having 3 moles of ethoxylation, sold under the trademark "Triton X-35" Rohm & Haas Company. "B" is octylphenoxy polyethoxyethanol having 30 moles of ethoxylation, sold under the trademark "Triton X-305" Rohm & Haas Company. All treatment levels are given in ppm, actives. From Table I, it can be seen that the 1:3 (copolymer/APE) to 3:1 molar ratios of the combined treatment are especially efficacious in controlling calcium sulfate formation.

TABLE II

Calcium Phosphate Inhibition

| | Copolymer | Molar Ratio of Monomers | Mol. Wt. Copolymer | APE Composition | Molar Ratio Copoly/APE | ppm Treatment | % Calcium Phosphate Inhibition |
|---|---|---|---|---|---|---|---|
| Comp. Ex. 16 | AA/HPA | AA/HPA = 3:1 | ≈6000 | — | 1:0 | 2.0 | 0.2 |
| Comp. Ex. 17 | " | " | " | — | " | 4.0 | 3.3 |
| Comp. Ex. 18 | " | " | " | — | " | 8.0 | 77.7 |
| Comp. Ex. 19 | — | — | — | Formula 5 | 0:1 | 2.0 | 0.9 |
| Comp. Ex. 20 | — | — | — | " | " | 4.0 | −1.9 |
| Comp. Ex. 21 | — | — | — | " | " | 8.0 | −0.4 |
| Example 28 | AA/HPA | AA/HPA = 3:1 | ≈6000 | " | 1:1 | 2.0 | −2.3 |
| Example 29 | " | " | " | " | " | 4.0 | 7.4 |
| Example 30 | " | " | " | " | " | 8.0 | 5.8 |
| Example 31 | " | " | " | " | 1:3 | 2.0 | −2.1 |
| Example 32 | " | " | " | " | " | 4.0 | 1.6 |
| Example 33 | " | " | " | " | " | 8.0 | 10.4 |

TABLE II-continued
Calcium Phosphate Inhibition

|  | Copolymer | Molar Ratio of Monomers | Mol. Wt. Copolymer | APE Composition | Molar Ratio Copoly/APE | ppm Treatment | % Calcium Phosphate Inhibition |
|---|---|---|---|---|---|---|---|
| Example 34 | " | " | " | " | 3:1 | 2.0 | 4.2 |
| Example 35 | " | " | " | " | " | 4.0 | 10.7 |
| Example 36 | " | " | " | " | " | 8.0 | 64.2 |
| Comp. Ex. 22 | AA/HPA | AA/HPA = 3:1 | ≈6000 | — | — | 3.0 | 2.0 |
| Comp. Ex. 23 | — | — | — | Formula 5 | — | 1.0 | 0.0 |
| Example 37 | AA/HPA | AA/HPA = 3:1 | ≈6000 | " | 3:1 | 4.0 | 11.0 |
| Comp. Ex. 24 | AA/HPA | " | " | — | — | 4.5 | 15.0 |
| Comp. Ex. 25 | — | — | — | Formula 5 | — | 1.5 | 0.0 |
| Example 38 | AA/HPA | " | ≈6000 | " | 3:1 | 6.0 | 31.0 |
| Comp. Ex. 26 | AA/HPA | " | " | — | — | 6.0 | 32.0 |
| Comp. Ex. 27 | — | — | — | Formula 5 | — | 2.0 | 0.9 |
| Example 39 | AA/HPA | AA/HPA = 3:1 | ≈6000 | " | 3:1 | 8.0 | 64.2 |
| Comp. Ex. 28 | AA/HPA | " | " | — | — | 2.0 | 0.2 |
| Comp. Ex. 29 | — | — | — | Formula 5 | — | 6.0 | 0.0 |
| Example 40 | AA/HPA | AA/HPA = 3:1 | ≈6000 | " | 1:3 | 8.0 | 10.4 |

Here, it can be seen that the 3:1 copolymer/APE treatment is especially efficacious in inhibiting $Ca_3(PO_4)_2$ formation.

From Table II it can be seen that the inhibition provided by the combined treatments is greater than the sum of the inhibition of the component materials. For instance, Example 37 exhibits greater inhibition than the combination of comparative Examples 22 and 23. Example 38 exhibits greater inhibition than the combination of comparative Examples 24 and 25. Example 39 exhibits greater inhibition than the combination of comparative Examples 26 and 27. Similarly, Example 40 exhibits greater inhibition than the combination of comparative Examples 28 and 29.

In order to determine the efficacy of the combined treatment of the present invention, in inhibiting $CaCO_3$ formation, the following test procedure and examples were undertaken. The results appear in Table III.

CALCIUM CARBONATE INHIBITION

| Conditions | Solutions |
|---|---|
| pH 8.5 | 3.25g $CaCl_2 \cdot 2H_2O$/liter DI $H_2O$ |
| T = 70° C. | 2.48g $Na_2CO_3$/liter DI $H_2O$ |
| 5 hour equilibrium | |
| 442 ppm $Ca^{+2}$ | |
| 702 ppm $CO_3$ | |

PROCEDURE (1) Add 50 ml $CaCl_2.2H_2O$ pre-adjusted to pH 8.5 to a 4 oz. bottle.
(2) Treatment
(3) Add 50 ml $Na_2CO_3$ pre-adjusted to pH 8.5
(4) Heat 5 hours at 70° C. water bath. Remove and cool to room temperature.
(5) Filter 5 mls through 0.2µ filters.
(6) Adjust samples to pH <1.0 with conc. HCl (1 g Conc. HCl)
(7) Allow to stand at least 15 minutes.
(8) Dilute to 50 mls with DI $H_2O$.
(9) Bring pH to 12.0 with NaOH.
(10) Add $Ca^{+2}$ indicator (1 level).
(11) Titrate with EDTA to purple-violet endpoint.

Calculation $$\% \text{ Inhibition} = \frac{\text{ml EDTA titrated (treated)} - \text{ml EDTA titrated (control)}}{\text{ml EDTA titrated (Ca}^{+2}\text{ stock)} - \text{ml EDTA titrated (control)}} \times 100$$

TABLE III
Calcium Carbonate Inhibition
AA/HPA in Combination with APE

|  | Copolymer | Molar Ratio of Monomers | Alkyl Group of APE Compound | Moles of Ethoxylation | Weight Ratio Copoly to APE | ppm Total Actives | % $CaCO_3$ Inhibition |
|---|---|---|---|---|---|---|---|
| Comp. Ex. 30 | AA/HPA | 3:1 | — | — | 1:0 | 2.5 | 59.3 |
| Comp. Ex. 31 | " | " | — | — | " | 5.0 | 71.7 |
| Comp. Ex. 32 | " | " | — | — | " | 10.0 | 89.7 |
| Comp. Ex. 33 | " | " | Octyl | 9.3 | 0:1 | 2.5 | 0 |
| Comp. Ex. 34 | " | " | " | " | " | 5.0 | 0 |
| Comp. Ex. 35 | " | " | " | " | " | 10.0 | 4.1 |
| Example 41 | " | " | " | " | 1:1 | 2.5 | 8.3 |
| Example 42 | " | " | " | " | " | 5.0 | 53.8 |
| Example 43 | " | " | " | " | " | 10.0 | 70.3 |
| Example 44 | " | " | " | " | 1:3 | 2.5 | 0 |
| Example 45 | " | " | " | " | " | 5.0 | 7.6 |
| Example 46 | " | " | " | " | " | 10.0 | 52.4 |
| Example 47 | " | " | " | " | 3:1 | 2.5 | 42.1 |
| Example 48 | " | " | " | " | " | 5.0 | 66.2 |
| Example 49 | " | " | " | " | " | 10.0 | 86.2 |
| Example 50 | " | " | Nonyl | 9.5 | 0:1 | 2.5 | 7.6 |

TABLE III-continued

Calcium Carbonate Inhibition
AA/HPA in Combination with APE

| | Copolymer | Molar Ratio of Monomers | Alkyl Group of APE Compound | Moles of Ethoxylation | Weight Ratio Copoly to APE | ppm Total Actives | % $CaCO_3$ Inhibition |
|---|---|---|---|---|---|---|---|
| Example 51 | " | " | " | " | " | 5.0 | 0 |
| Example 52 | " | " | " | " | " | 10.0 | 0 |
| Example 53 | " | " | " | " | 1:1 | 2.5 | 24.8 |
| Example 54 | " | " | " | " | " | 5.0 | 51.7 |
| Example 55 | " | " | " | " | " | 10.0 | 73.1 |
| Example 56 | " | " | " | " | 1:3 | 2.5 | 0 |
| Example 57 | " | " | " | " | " | 5.0 | 29.7 |
| Example 58 | " | " | " | " | " | 10.0 | 58.6 |
| Example 59 | " | " | " | " | 3:1 | 2.5 | 46.2 |
| Example 60 | " | " | " | " | " | 5.0 | 67.6 |
| Example 61 | " | " | " | " | " | 10.0 | 83.5 |

Nonylphenoxypolyethoxyethanol having about 9.5 moles of ethoxylation is sold under the trademark "Surfonic N-95" by Jefferson Chemical Co.
From Table III above, it can be seen that the combined treatment of the present invention, especially within the molar ratio (AA/HPA:APE) of about 3:1 is highly efficacious in inhibiting calcium carbonate formation. AA/HPA here has a molecular weight of about 6,000.

In order to demonstrate the effectiveness of the combined treatment composition and method in dispersing suspended particulate matter, the following procedures using $Fe_2O_3$ and clay, separately, as suspended solids, were undertaken. The results appear in Table IV hereinbelow. In the results, it is noted that increasing $\Delta\%T$ values indicate better treatment as more particles remain suspended in the aqueous medium.

$Fe_2O_3$ DISPERSION PROCEDURE

| Conditions | Solutions |
|---|---|
| T = 25° C. | 0.1% solution $Fe_2O_3$ in $DIH_2O$ |
| pH = 7.5 | 3.68g $CaCl_2 \cdot 2H_2O$/100 ml $DIH_2O$ |
| 200 ppm $Ca^{+2}$ as $CaCO_3$ | |

Procedure (1) Prepare a suspension of 0.1% $Fe_2O_3$ in $DIH_2O$.
(2) Adjust hardness to 200 ppm $Ca^{+2}$ as $CaCO_3$ using $CaCl_2 \cdot 2H_2O$ solution—8 ml/1000 ml of $Fe_2O_3$ solution.
(3) Using overhead mixer, mix suspension ½ hour at 1000 rpms.
(4) Remove solution to magnetic stirrer and adjust to pH 7.5 (about 20 minutes to stabilize pH).
(5) Return solution to overhead mixer.
(6) Take 90 ml aliquots of suspension and place 4 oz. glass bottle.
(7) Add treatment and DI water to bring total volume to 100 ml.
(8) Cap bottle, invert several times and place on reciprocating shaker at a moderate speed of about 40 spm for ½ hour.
(9) Place on vibration-proof surface and allow to stand 18 hours.
(10) Without disturbing settled phase, pipet the top 40 mls off the sample. Place in a cell and read %T (at 415 nm).

Calculation $\Delta\%T = \%T\ (\text{control}) - \%T\ (\text{treated})$

CLAY DISPERSION (KAOLIN) PROCEDURE

| Conditions | Solutions |
|---|---|
| T = 25° C. | 0.1% solution Hydrite UF in $DIH_2O$ |
| pH = 7.5 | 3.68g $CaCl_2 \cdot 2H_2O$/100 ml $DIH_2O$ |
| 200 ppm $Ca^{+2}$ as $CaCO_3$ | |

Procedure (1) Prepare a suspension of 0.1% Hydrite UF in $DIH_2O$.
(2) Adjust hardness to 200 ppm $Ca^{+2}$ as $CaCO_3$ using $CaCl_2 \cdot 2H_2O$ solution—8 ml/1000 ml of Hydrite solution.
(3) Using overhead mixer, mix suspension ½ hour at 1000 rpms.
(4) Remove solution to magnetic stirrer and adjust to pH 7.5 (about 20 minutes to stabilize pH).
(5) Return solution to overhead mixer.
(6) Take 90 ml aliquots of suspension and place 4 oz. glass bottle.
(7) Add treatment and DI water to bring total volume to 100 ml.
(8) Cap bottle, invert several times and place on reciprocating shaker at a moderate speed of about 40 spm for ½ hour.
(9) Place on vibration-proof surface and allow to stand 18 hours.
(10) Without disturbing settled phase, pipet the top 40 mls off the sample. Place in a cell and read %T (at 415 nm).

Calculation $\Delta\%T = \%T\ (\text{control}) - \%T\ (\text{treated})$

TABLE IV $Fe_2O_3$ and Clay Dispersion

| | Copolymer | Molar Ratio of Monomers | Mol. Wt. Copolymer | APE Comp. | Molar Ratio Copolymer/APE | ppm Treatment | $\Delta\%T$ $Fe_2O_3$ | $\Delta\%T$ Clay |
|---|---|---|---|---|---|---|---|---|
| Comp. Ex. 36 | AA/HPA | AA/HPA = 3:1 | ≃6,000 | — | — | .5 | −1.3 | 8.3 |
| Comp. Ex. 37 | " | " | " | — | — | 1.0 | 2.9 | 16.6 |
| Comp. Ex. 38 | " | " | " | — | — | 2.0 | 30.1 | 46.7 |
| Comp. Ex. 39 | — | — | — | Formula 5 | — | .5 | 2.1 | −0.6 |
| Comp. Ex. 40 | — | — | — | " | — | 1.0 | 2.8 | −0.8 |
| Comp. Ex. 41 | — | — | — | " | — | 2.0 | 3.5 | −0.1 |

TABLE IV-continued

Fe₂O₃ and Clay Dispersion

| | Copolymer | Molar Ratio of Monomers | Mol. Wt. Copolymer | APE Comp. | Molar Ratio Copolymer/APE | ppm Treatment | Δ % T Fe₂O₃ | Δ % T Clay |
|---|---|---|---|---|---|---|---|---|
| Example 62 | AA/HPA | AA/HPA = 3:1 | ≈6,000 | " | 1:1 | .5 | 1.3 | 0.1 |
| Example 63 | " | " | " | " | " | 1.0 | 0.8 | 7.8 |
| Example 64 | " | " | " | " | " | 2.0 | 0.9 | 14.3 |
| Example 65 | " | " | " | " | 1:3 | .5 | 1.1 | 2.9 |
| Example 66 | " | " | " | " | " | 1.0 | −0.1 | 3.9 |
| Example 67 | " | " | " | " | " | 2.0 | −0.8 | 7.7 |
| Example 68 | " | " | " | " | 3:1 | .5 | 1.2 | 6.7 |
| Example 69 | " | " | " | " | " | 1.0 | 0.0 | 8.4 |
| Example 70 | " | " | " | " | " | 2.0 | 14.0 | 37.4 |
| Comp. Ex. 42 | AA/HPA | AA/HPA = 3:1 | ≈6,000 | — | 1:0 | 2.5 | — | 48.0 |
| Comp. Ex. 43 | " | " | " | — | " | 5.0 | — | 58.0 |
| Comp. Ex. 44 | " | " | " | — | " | 10.0 | — | 58.5 |
| Comp. Ex. 45 | — | — | — | "A" | 0:1 | 2.5 | — | 0.0 |
| Comp. Ex. 46 | — | — | — | " | " | 5.0 | — | 0.0 |
| Comp. Ex. 47 | — | — | — | " | " | 10.0 | — | 0.0 |
| Example 71 | AA/HPA | AA/HPA = 3:1 | ≈6,000 | " | 1:1 | 2.5 | — | 18.0 |
| Example 72 | " | " | " | " | " | 5.0 | — | 43.0 |
| Example 73 | " | " | " | " | " | 10.0 | — | 51.0 |
| Example 74 | " | " | " | " | 1:3 | 2.5 | — | 5.0 |
| Example 75 | " | " | " | " | " | 5.0 | — | 16.5 |
| Example 76 | " | " | " | " | " | 10.0 | — | 44.5 |
| Example 77 | " | " | " | " | 3:1 | 2.5 | — | 33.5 |
| Example 78 | " | " | " | " | " | 5.0 | — | 49.5 |
| Example 79 | " | " | " | " | " | 10.0 | — | 52.0 |
| Comp. Ex. 48 | — | — | — | "B" | 0:1 | 2.5 | — | 0.0 |
| Comp. Ex. 49 | — | — | — | " | " | 5.0 | — | 0.0 |
| Comp. Ex. 50 | — | — | — | " | " | 10.0 | — | 0.0 |
| Example 80 | AA/HPA | AA/HPA = 3:1 | ≈6,000 | " | 1:1 | 2.5 | — | 11.5 |
| Example 81 | " | " | " | " | " | 5.0 | — | 44.0 |
| Example 82 | " | " | " | " | " | 10.0 | — | 54.0 |
| Example 83 | " | " | " | " | 1:3 | 2.5 | — | 0.0 |
| Example 84 | " | " | " | " | " | 5.0 | — | 13.5 |
| Example 85 | " | " | " | " | " | 10.0 | — | 43.0 |
| Example 86 | AA/HPA | AA/HPA = 3:1 | ≈6,000 | "B" | 3:1 | 2.5 | — | 49.5 |
| Example 87 | " | " | " | " | " | 5.0 | — | 56.5 |
| Example 88 | " | " | " | " | " | 10.0 | — | 56.5 |
| Comp. Ex. 51 | " | " | " | — | 1:0 | 2.5 | 41.0 | — |
| Comp. Ex. 52 | " | " | " | — | " | 5.0 | 70.0 | — |
| Comp. Ex. 53 | " | " | " | — | " | 10.0 | 88.0 | — |
| Comp. Ex. 54 | — | — | — | Formula 5 | 0:1 | 2.5 | 0.0 | — |
| Comp. Ex. 55 | — | — | — | " | " | 5.0 | 0.0 | — |
| Comp. Ex. 56 | — | — | — | " | " | 10.0 | 0.0 | — |
| Example 89 | AA/HPA | AA/HPA = 3:1 | ≈6,000 | " | 1:1 | 2.5 | 0.0 | — |
| Example 90 | " | " | " | " | " | 5.0 | 64.0 | — |
| Example 91 | " | " | " | " | " | 10.0 | 86.5 | — |
| Example 92 | " | " | " | " | 1:3 | 2.5 | 0.0 | — |
| Example 93 | " | " | " | " | " | 5.0 | 1.0 | — |
| Example 94 | " | " | " | " | " | 10.0 | 35.0 | — |
| Example 95 | " | " | " | " | 3:1 | 2.5 | 27.0 | — |
| Example 96 | " | " | " | " | " | 5.0 | 61.5 | — |
| Example 97 | " | " | " | " | " | 10.0 | 89.0 | — |
| Comp. Ex. 57 | — | — | — | "C" | 0:1 | 2.5 | 0.0 | — |
| Comp. Ex. 58 | — | — | — | " | " | 5.0 | 0.0 | — |
| Comp. Ex. 59 | — | — | — | " | " | 10.0 | 0.0 | — |
| Example 98 | AA/HPA | AA/HPA = 3:1 | ≈6,000 | " | 1:1 | 2.5 | 1.0 | — |
| Example 99 | " | " | " | " | " | 5.0 | 41.5 | — |
| Comp. Ex. 100 | " | " | " | " | " | 10.0 | 78.0 | — |
| Example 101 | " | " | " | " | 1:3 | 2.5 | 0.5 | — |
| Example 102 | " | " | " | " | " | 5.0 | 3.0 | — |
| Example 103 | " | " | " | " | " | 10.0 | 35.0 | — |
| Example 104 | " | " | " | " | 3:1 | 2.5 | 21.5 | — |
| Example 105 | " | " | " | " | " | 5.0 | 61.0 | — |
| Example 106 | " | " | " | " | " | 10.0 | 85.0 | — |

In the above Table IV, APE "A" is octylphenoxy polyethoxyethanol having 3 moles of ethoxylation - "Triton X-35," APE "Formula 5" is the same compound as shown above in Formula 5. APE "B" is octylphenoxy polyethoxyethanol having 30 moles of ethoxylation - "Triton X-305." APE "C" is nonyl phenoxypolyethoxyethanol having about 9.5 moles of ethoxylation - "Surfonic N-95." All treatment levels are expressed in ppm active ingredients.

From Table IV, it can be seen that the combined treatment of the present invention is effective in dispersing iron oxide and clay suspended particles. Expecially efficacious, for this purpose, is the 3:1 molar ratio of copolymer: APE compound.

In order to determine the effectiveness of the combined treatment of the present invention in dispersing organic substances, particularly oil, the following procedure and examples were undertaken. The results are recorded in Table V.

OIL DISPERSION TEST

| Conditions | Solutions |
|---|---|
| 1000 ppm Oil | 36.72g CaCl₂ . 2H₂O/1l DIH₂O |
| 125 ppm Ca⁺² as CaCO₃ | |
| pH 7.5 | |
| 18 hour equilibrium | |

| Conditions | Solutions |
|---|---|
| Ambient Temperature | |

Procedure (1) Prepare a 125 ppm $Ca^{+2}$ as $CaCO_3$ solution. For 2 liters:
   a. Add 10 ml of $CaCl_2.2H_2O$ solution to 1950 ml $DIH_2O$.
   b. Adjust pH to 7.5.
   c. Bring volume to 2 liters with $DIH_2O$.
(2) To 4 oz. glass bottles, add the desired treatment.
(3) Then add 0.10 g of oil.
(4) Next add 99.90 g of the solution prepared in step #1.
(5) Shake at high speed on shaker for 15 minutes.
(6) Let stand at room temperature for 18 hours.
(7) Measure % light transmittance (415 nm) by pipetting 30 mls of sample into the Leitz cuvette. Take sample from the center without disturbing the layers.
(8) Calculate $\Delta\%T$.
   $\Delta\%T = \%T\text{ (control)} - \%T\text{ (treated)}$ salt thereof and moieties (b) of an hydroxylated lower alkyl acrylate, wherein the moieties of the polymer (I) have the following formula

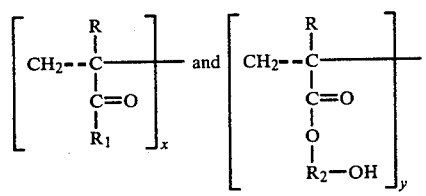

wherein R is hydrogen or a lower alkyl of from 1 to 3 carbon atoms; $R_1$ is OH, OM, or $NH_2$ where M is a water soluble cation; $R_2$ is a lower alkyl of from about 2–6 carbon atoms and the molar ratio of x to y is about 34:1 to 1:4, and an effective amount of a water soluble alkyl phenoxy polyethoxyethanol compound (II) wherein the alkyl group of the alkyl phenoxy polyethoxyethanol compound has from about 6–12 carbon atoms.

2. Composition as defined in claim 1 wherein the

TABLE V

Oil Dispersion
AA/HPA in Combination with APE

| | Copolymer | Molar Ratio of Monomers | Alkyl Group on APE Compound | Moles of Ethoxylation | Weight Ratio Copoly/APE | ppm Total Actives | $\Delta \% T$ |
|---|---|---|---|---|---|---|---|
| Comp. Ex. 60 | AA/HPA | 3:1 | — | — | 1:0 | 10 | 1.4 |
| Comp. Ex. 61 | " | " | — | — | | 25 | 0.0 |
| Comp. Ex. 62 | " | " | — | — | | 50 | 4.6 |
| Comp. Ex. 63 | " | " | Nonyl | 9.5 | 0:1 | 10 | 16.1 |
| Comp. Ex. 64 | " | " | " | " | | 25 | 59.2 |
| Comp. Ex. 65 | " | " | " | " | | 50 | 88.8 |
| Example 107 | " | " | " | " | 1:1 | 10 | 7.5 |
| Example 108 | " | " | " | " | | 25 | 19.1 |
| Example 109 | " | " | " | " | | 50 | 41.7 |
| Example 110 | " | " | " | 1:3 | 10 | 11.0 | |
| Example 111 | " | " | " | " | | 25 | 51.9 |
| Example 112 | " | " | " | " | | 50 | 82.9 |
| Example 113 | " | " | " | " | 3:1 | 10 | 4.1 |
| Example 114 | " | " | " | " | | 25 | 6.8 |
| Example 115 | " | " | " | " | | 50 | 20.9 |
| Comp. Ex. 66 | AA/HPA | 3:1 | — | — | 1:0 | 10 | 9.1 |
| Comp. Ex. 67 | " | " | — | — | | 25 | 12.6 |
| Comp. Ex. 68 | " | " | — | — | | 50 | 4.0 |
| Comp. Ex. 69 | % T | " | Octyl | 9.3 | 0:1 | 10 | 35.3 |
| Comp. Ex. 70 | " | " | " | " | | 25 | 72.3 |
| Comp. Ex. 71 | " | " | " | " | | 50 | 82.8 |
| Example 116 | " | " | " | " | 1:1 | 10 | 41.8 |
| Example 117 | " | " | " | " | | 25 | 43.9 |
| Example 118 | " | " | " | " | | 50 | 74.3 |
| Example 119 | " | " | " | " | 1:3 | 10 | 24.7 |
| Example 120 | " | " | " | " | | 25 | 72.1 |
| Example 121 | " | " | " | " | | 50 | 81.8 |
| Example 122 | " | " | " | " | 3:1 | 10 | 19.6 |
| Example 123 | " | " | " | " | | 25 | 25.2 |
| Example 124 | " | " | " | " | | 50 | 41.1 |

In Table V, the nonyl APE compound is "Surfonic N-95". The octyl APE compound is shown in the disclosure Formula V. Here, it can be seen that the 1:3 molar ratio AA/HPA:APE is especially effective in dispersing oil. It is noted that higher $\Delta \% T$ values here represent successful properties as more oil is kept in a suspended state.

While we have shown and described herein certain embodiments of the present invention, it is intended that there be covered as well any change or modification therein which may be made without departing from the spirit and scope of the invention as defined in the appended claims.

We claim:

1. Composition for treating an aqueous medium, said composition comprising an effective amount for the purpose of a water soluble polymer (I) comprising moieties (a) derived from an acrylic acid or water soluble molar ratio of said polymer (I) to said alkyl phenoxy polyethoxyethanol compound (II) is about 1:3 to about 3:1.

3. Composition as defined in claim 1 wherein said polymer (I) has a molecular weight of from about 500 to about 1,000,000.

4. Composition as defined in claim 1 wherein said polymer (I) is a copolymer of acrylic acid or a water soluble salt thereof and 2-hydroxy propylacrylate or hydroxy ethylacrylate.

5. Composition as defined in claim 1 wherein said alkyl phenoxy polyethoxyethanol compound (II) has the structural formula:

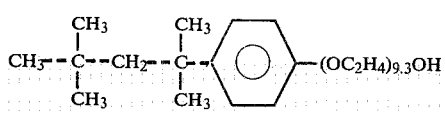

6. In a method of controlling the deposition of scale imparting precipitates on the structural parts of the system exposed to an aqueous medium containing scale imparting precipitates under deposit forming conditions, said scale imparting precipitates being selected from the group consisting of calcium carbonate, calcium phosphate and calcium sulfate, which method comprises adding to said aqueous medium an effective amount for the purpose of a water soluble polymer (I) comprising moieties (a) derived from an acrylic acid or water soluble salt thereof and moieties (b) of an hydroxylated lower alkyl acrylate, wherein the moieties of the polymer have the following formula

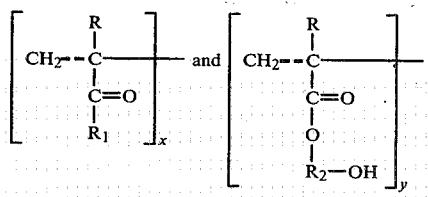

wherein R is hydrogen or a lower alkyl of from 1 to 3 carbon atoms; $R_1$ is OH, OM or $NH_2$ where M is a water soluble cation; $R_2$ is a lower alkyl of from about 2-6 carbon atoms and a mole ratio of x to y is 34:1 to 1:4, the improvement comprising adding to said aqueous medium an effective amount of a water soluble alkyl phenoxy polyethoxyethanol compound (II) wherein the alkyl group of said alkyl phenoxy polyethoxyethanol compound has from about 6 to 12 carbon atoms.

7. Method as defined in claim 6 wherein the molar ratio of polymer (I) to said alkyl phenoxy polyethoxyethanol compound (II) is about 1:3 to 3:1, and wherein said polymer (I) and said alkyl phenoxy polyethoxyethanol compound (II) are added to said aqueous medium in an amount of about 0.1–500 parts polymer and alkyl polyethoxyethanol per million parts of said aqueous medium.

8. Method as defined in claim 6 wherein said system is a steam generating system.

9. Method as defined in claim 6 wherein said system is a cooling water system.

10. Method as defined in claim 6 wherein said system is a gas scrubbing system.

11. Method as defined in claim 6 wherein said polymer (I) has a molecular weight of from about 500 to 1,000,000.

12. Method as defined in claim 11 wherein said polymer (I) is a copolymer of acrylic acid or a water soluble salt thereof and 2-hydroxy propylacrylate or hydroxy ethylacrylate.

13. Method as defined in claim 6 wherein said alkyl phenoxy polyethoxyethanol compound (II) has the structural formula:

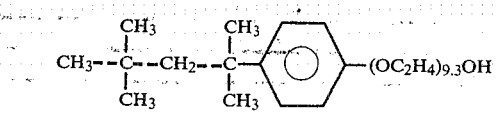

14. A method of dispersing and maintaining dispersed particulate matter in a system having an aqueous medium which contains particulate matter selected from the group consisting of clay, iron oxide, and mixtures thereof, which method comprises adding to the aqueous medium an effective amount for the purpose of a water soluble polymer (I) comprising moieties (a) derived from an acrylic acid or water soluble salt thereof and moieties (b) of an hydroxlated lower alkyl acrylate, wherein the moieties of the polymer (I) have the following formulas

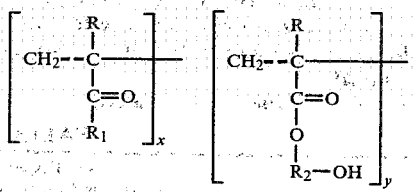

wherein R is hydrogen or a lower alkyl group of from 1 to 3 carbon atoms; $R_1$ is OH, OM or $NH_2$, where M is a water soluble cation; $R_2$ is a lower alkyl group of from about 2-6 carbon atoms and the mole ratio of x:y is about 34:1 to 1:4, said method comprising also adding to said system, an effective amount for the purpose of a water soluble alkyl phenoxy polyethoxyethanol compound wherein the alkyl group of said compound (II) has from about 6 to 12 carbon atoms.

15. Method as defined in claim 14 wherein the molar ratio of said polymer (I) to said compound (II) is about 1:3 to about 3:1, and wherein said polymer (I) and compound (II) are added to said system in an amount of about 0.1-500 parts (I) and (II) per million parts of said aqueous medium.

16. Method as defined in claim 15 wherein said polymer (I) has a molecular weight of about 500 to 1,000,000.

17. Method as defined in claim 16 wherein said polymer (I) comprises a copolymer of acrylic acid or a water soluble salt thereof and 2 hydroxypropyl acrylate, or hydroxyethylacrylate.

18. Method as defined in claim 15, 16 or 17 wherein said compound (II) has the structural formula

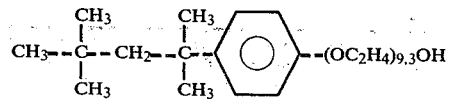

19. Method as defined in claim 14 wherein said system comprises a steam generating system.

20. Method as defined in claim 14 wherein said system comprises a cooling water system.

21. Method as defined in claim 14 wherein said system comprises a gas scrubbing system.

22. A method of dispersing, and maintaining dispersed, oil, existing in an aqueous medium, said method comprising adding to said aqueous medium an effective amount for the purpose of a water soluble polymer (I)

comprising moieties (a) derived from an acrylic acid or water soluble salt thereof and moieties (b) of an hydroxylated lower alkyl acrylate, wherein the moietites of the polymer (I) have the following formula

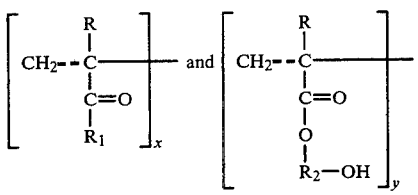

wherein R is hydrogen or a lower alkyl of from 1 to 3 carbon atoms; $R_1$ is OH, OM, or $NH_2$ where M is a water soluble cation; $R_2$ is a lower alkyl of from about 2-6 carbon atoms and the molar ratio of x to y is about 34:1 to 1:4, and an effective amount of a water soluble alkyl phenoxy polyethoxyethanol compound (II) wherein the alkyl group of the alkyl phenoxy polyethoxyethanol compound has from about 6-12 carbon atoms.

23. Method as defined in claim 22 wherein the molar ratio of said polymer (I) to said compound (II) is about 1:3 to about 3:1, and wherein said polymer (I) and said compound (II) are added to said aqueous medium in an amount of about 0.1-500 parts (I) and (II) per million parts of said aqueous medium.

24. Method as defined in claim 22 wherein said polymer (I) has a molecular weight of about 500 to 1,000,000.

25. Method as defined in claim 22 wherein said polymer (I) comprises a copolymer of acrylic acid or a water soluble salt thereof and 2 hydroxypropyl acrylate, or hydroxyethylacrylate.

26. Method as defined in claim 22, 23, 24, or 25 wherein said compound (II) has the structural formula

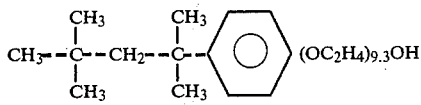

27. Method as defined in claim 22 wherein said aqueous medium is that of a steam generating system.

28. Method as defined in claim 22 wherein said aqueous medium is that of a cooling water system.

29. Method as defined in claim 22 wherein said aqueous medium is that of a gas scrubbing system.

* * * * *

UNITED STATES PATENT OFFICE
CERTIFICATE OF CORRECTION

Patent No. 4,326,980           Dated April 27, 1982

Inventor(s) Snyder et al

It is certified that error appears in the above-identified patent and that said Letters Patent are hereby corrected as shown below:

Column 15, line 67, the entry under "Solutions" should read:

$36.72g\ CaCl_2 \cdot 2H_2O\ /\ 1\ 1\ DIH_2O$

Column 17, under Table V, Example 110:

Moles of Ethoxylation should read "9.5"

Weight Ratio Copoly/APE should read "1:3"

ppm Total Actives should read "10"

$\Delta$ % T should read "11.0"

Column 17, under Table V, last sentence of footnote should read:

"It is noted that higher $\Delta$ % T values here represent..."

Signed and Sealed this

Seventeenth Day of August 1982

[SEAL]

Attest:

GERALD J. MOSSINGHOFF

*Attesting Officer*      *Commissioner of Patents and Trademarks*